(12) United States Patent
Hermans

(10) Patent No.: US 11,509,165 B2
(45) Date of Patent: Nov. 22, 2022

(54) AUTOMATIC TRANSFER SWITCH FOR LIGHTING LOADS WITH INTEGRAL LOAD SHEDDING BY DIMMING CONTROL

(71) Applicant: Leon Hermans, San Leandro, CA (US)

(72) Inventor: Leon Hermans, San Leandro, CA (US)

(73) Assignee: Myers Emergency Power Systems LLC, Bethlehem, PA (US)

(*) Notice: Subject to any disclaimer, the term of this patent is extended or adjusted under 35 U.S.C. 154(b) by 35 days.

(21) Appl. No.: 17/119,317

(22) Filed: Dec. 11, 2020

(65) Prior Publication Data
US 2021/0099011 A1 Apr. 1, 2021

Related U.S. Application Data

(63) Continuation-in-part of application No. 16/111,678, filed on Aug. 24, 2018, now Pat. No. 10,944,288.

(60) Provisional application No. 62/946,780, filed on Dec. 11, 2019, provisional application No. 62/549,789, filed on Aug. 24, 2017.

(51) Int. Cl.
  *H02J 9/06* (2006.01)

(52) U.S. Cl.
  CPC .................... *H02J 9/065* (2013.01)

(58) Field of Classification Search
  CPC ........... H02J 9/065; H02J 9/02; H02J 9/04–08
  See application file for complete search history.

(56) References Cited

U.S. PATENT DOCUMENTS

| | | | |
|---|---|---|---|
| 9,214,834 B1* | 12/2015 | Lunn ...................... | H05B 47/17 |
| 10,199,862 B2 | 2/2019 | Garbowicz et al. | |
| 10,432,021 B2 | 10/2019 | Shen et al. | |
| 10,998,762 B1* | 5/2021 | Chen ...................... | H05B 47/19 |
| 2003/0006709 A1* | 1/2003 | Tabell ..................... | H02J 9/065 |
| | | | 315/86 |
| 2011/0181206 A1* | 7/2011 | Liess ...................... | H02J 9/065 |
| | | | 315/307 |
| 2012/0326614 A1* | 12/2012 | Tsuji ..................... | H05B 45/10 |
| | | | 315/200 R |

(Continued)

*Primary Examiner* — Toan T Vu
*Assistant Examiner* — David A Shiao
(74) *Attorney, Agent, or Firm* — Potomac Law Group, PLLC; Vincent M DeLuca

(57) ABSTRACT

An automatic power transfer switch system includes a dimmable lighting load adapted to operate under a variable amount of power in dependence on a dimming control signal, an automatic transfer switch configured to connect a primary electrical power source to the dimmable lighting load under normal operating conditions of the primary electrical power source in a first mode, and to automatically disconnect the primary electrical power source from the load and connect an emergency electrical power source to the load under malfunctioning operating conditions of the primary electrical power source in a second mode, the automatic transfer switch further including an integrated load reduction dimmer configured to provide a dimming control signal to the dimmable lighting load. A load shedding controller communicatively coupled to the automatic transfer switch to provide a load shedding control signal to the automatic transfer switch, wherein the integrated load reduction dimmer develops the dimming control signal in response to the load shedding control signal.

15 Claims, 7 Drawing Sheets

(56) References Cited

U.S. PATENT DOCUMENTS

| | | | |
|---|---|---|---|
| 2013/0127362 A1* | 5/2013 | Trainor | G01R 31/44 |
| | | | 324/414 |
| 2013/0154370 A1* | 6/2013 | Albsmeier | H02J 9/08 |
| | | | 307/64 |
| 2015/0048685 A1* | 2/2015 | Wilson | H05B 45/38 |
| | | | 307/66 |
| 2016/0192455 A1* | 6/2016 | Dubuc | H02J 9/061 |
| | | | 315/86 |
| 2017/0279300 A1* | 9/2017 | Catalano | H02J 7/0068 |
| 2019/0067990 A1 | 2/2019 | Hermans | |
| 2019/0181679 A1* | 6/2019 | Northway | H02J 13/00004 |

* cited by examiner

AUTOMATIC TRANSFER SWITCH FOR LIGHTING LOADS WITH INTEGRAL LOAD SHEDDING BY DIMMING CONTROL

CROSS-REFERENCE TO RELATED APPLICATIONS AND CLAIM OF PRIORITY

This application is a continuation-in-part of copending application Ser. No. 16/111,678 filed Aug. 24, 2018, which claims priority under 35 U.S.C. 119(e) from Provisional Application Ser. No. 62/549,789 filed Aug. 24, 2017. This application also claims priority under 35 U.S.C. 119(e) from Provisional Application Ser. No. 62/946,780 filed Dec. 11, 2019, all of which prior applications are incorporated herein by reference in their entireties.

BACKGROUND

The invention relates to lighting and illumination systems and in particular to emergency back-up power systems that provide emergency power to lighting devices (such as LEDs, fluorescent lamps, high intensity discharge (HID) lamps, halogen lamps etc.) in the event of a mains power failure. Such emergency power systems are critical, for example, when used in buildings such as office buildings, hospitals, auditoriums, apartment buildings, etc. to allow occupants to safely evacuate in the event of an emergency such as a fire or other peril.

Emergency lighting systems are generally known in the art. For example, U.S. Pat. No. 10,199,862 discloses a dimming system in which a main line voltage is provided to an input of a driver which converts the input line voltage to a specific voltage indicated by a control signal received from a dimmer controller (such as a well-known 0-10V controller). The driver outputs the specific voltage to drive a lighting load. The system includes an emergency dimming apparatus including a battery, a charger, a power converter and a controller. In the power failure mode the dimming apparatus bypasses the dimmer controller. The controller monitors the line voltage and when it detects the absence of line voltage the emergency dimming apparatus enters a power failure mode in which the power converter converts an output voltage from the battery and provides the converted voltage to the input of the driver. The driver then drives the lighting load in response to an emergency control signal from the emergency dimming apparatus.

Another known emergency lighting system is described by U.S. Pat. No. 10,432,021. An inverter apparatus includes a line power control module that provides AC voltage from a mains power supply directly to a number of lighting device drivers in a normal operating state. In a power failure state, the inverter converts DC voltage from a battery to AC voltage and supplies the AC voltage to the line power control module which in turn outputs it to the lighting device drivers. In the power failure state a separate power detecting module detects the output power of the inverter. A dimming signal generating module then determines a dimming signal value based on the detected output power of the inverter. The dimming signal is sent to the lighting device drivers to adjust their power levels to maintain the output power of the inverter at its rated power.

Because of the limited power capacity that is typical of secondary power sources (i.e. batteries, fuel cells etc.) the concept of load shedding is an important consideration for such systems. Load shedding allows an emergency power system to operate less than the full load that is operated by the primary (i.e. AC mains) power source.

The above prior art patents are examples of dimming load shedding, which dims the connected lighting circuits to a reduced power level, thus reducing the power demand on the secondary power source while enabling widespread illumination at reduced levels.

The prior art also includes so-called circuit-level load shedding. This form of load reduction disconnects entire circuits under certain conditions to reduce the power demand on the secondary power source. Circuit-level load shedding is implemented through transfer switches with multiple circuit outputs. Circuit-level load shedding requires separate wiring of each load circuit to the transfer switch. This multiplies cost by increasing the required amount of cable, connectors, etc. and labor to install these materials. Circuit-level load shedding is also not versatile as it requires ON/OFF control of the lighting loads, thus leaving entire areas in darkness, which does not comply with many life-safety codes and regulations, making it unsuitable for emergency lighting purposes.

Battery systems with dimming load shedding capability as described in the above prior patents suffer from several disadvantages. Firstly, all loads on the emergency system must be dimmed to the same level because only one dimming control signal is produced. Additionally, the dimming control signal must be wired from the emergency system to all remote loads. In most cases the emergency back-up system is located in an electrical room or closet, while the lighting loads can be hundreds or thousands of feet away. The battery system, wiring, and circuit protection thus must all be oversized to account for the maximum full load output. This is a tremendous waste of materials and resources.

On the other hand, standalone dimmers installed at the load may not always activate when needed, for example due to a delay or break in the communication system. As a result, the emergency power system can overload, causing it to shut down or suffer permanent damage. This shutdown can occur when the system is needed most (i.e. an emergency situation or power outage) and can only be remedied by manual intervention of qualified service personnel, who are generally not available on short notice. This presents an immediate safety hazard to building occupants.

Prior art load shedding systems also require discrete power wiring or communication wiring to be installed and maintained between the loads, the load shedding system, the transfer switch system, and the central battery or emergency generator system. Oftentimes, these devices are made by separate suppliers using different communication protocols, requiring additional translator equipment, product certification, and system engineering resources.

In the event of an interruption or breakdown of communication, the entire system can be compromised and overloaded, resulting in a fire or safety hazard. Designing, installing and wiring the system is also costly due to the complexity of the system architecture and the physical distance between these systems.

SUMMARY OF THE INVENTION

The present invention is directed to automatic power transfer switching systems, and improves existing transfer switch and dimming load shedding technology, integrating them in one device. The invention provides automatic power reduction of the connected load when the transfer switch transfers the load from the primary power source to the alternate power source. This power reduction is enabled by an auxiliary dimming signal sent to the load (separate from the line and neutral of the transfer switch). This dimming signal can be adjusted based on numerous factors (such as power outage or brownout, user programming, timing, load current, fire alarm activation, or other sensor inputs).

Rather than requiring complete disconnection of loads (as in circuit-level load shedding), this transfer switch with integral dimming load shedding arrangement allows some or all loads within a circuit to be energized, as desired, but at reduced power levels, conserving limited generator or battery system power.

When compared to prior art battery systems, this integrated load shedding transfer switch system reduces the required electrical wiring significantly, as the invention can be installed next to the load, eliminating the need to run dimming control wiring from each load back to the battery system. The size of the electrical components within the battery system can also be reduced, as it does not need to be oversized to carry a higher (un-dimmed) maximum load.

When compared to prior art standalone dimming systems, there is no risk of miscoordination between the load shedding system and the secondary source. The integral load shedding system will simultaneously connect the load to the secondary power source and transmit the load shedding dimming signal. It will never connect an undimmed load to the secondary power source. This allows the secondary power system, including circuit protection, wire size, etc. to be sized for the reduced load level, saving significant material costs. Additionally, unlike the prior art, no communication wiring between the secondary power source and transfer switch with integral load shedding is required.

In prior art systems, where the load reduction device is integral to the auxiliary power source, the auxiliary power source wiring and transfer switch must be sized for the maximum pass-through load during normal (un-reduced/un-dimmed) operation.

In some embodiments of the present invention, multiple independent load reduction transfer switches are provided, such that the auxiliary power source wiring and transfer switch can be sized for the reduced/dimmed load seen during power outages. During normal operation, the load is placed exclusively on the primary power source and associated wiring and does not pass through the auxiliary power source.

Moreover, in prior art systems, the entire starting current demand is placed on the auxiliary power source instantaneously upon loss of the primary power source. By contrast, in some embodiments of the present invention, multiple independent load reduction transfer switches are provided such that the starting current can be gradually applied to auxiliary power source in multiple steps, by providing an adjustable time delay within each load reduction transfer switch. For example, the first transfer switch can connect to the auxiliary power source at t=0.5 seconds, a second transfer switch can connect at t=1.0 seconds, the third at t=1.5, etc. Electrical loads, such as lighting loads, often have higher starting current, which quickly reaches steady state in a matter of cycles (milliseconds), so a small delay can make a big difference.

Additionally, in prior art systems, where the load reduction device is integral to the auxiliary power source, one load reduction setting must be applied to the entire load of the auxiliary power source. This can be undesirable, as certain loads or areas may require higher power than others. By contrast, in embodiments of the present invention where multiple independent load reduction transfer switches are used, different loads in different areas can be set to different load reduction amounts as desired, such that critical areas may experience no load reduction at all.

Still further, in prior art systems, where the load reduction device is integral to the auxiliary power source, only one primary power source can be used for the entire auxiliary power source, and vice versa. In accordance with embodiments of the present invention having multiple independent load reduction transfer switches, multiple auxiliary power sources may be used with one primary power source, or multiple primary power sources may be used with one auxiliary power source.

Additionally, multiple units of the integral load shedding system can be used to provide different power or dimming levels for different areas, which is impossible under prior art arrangements.

DETAILED DESCRIPTION

Figure 1:
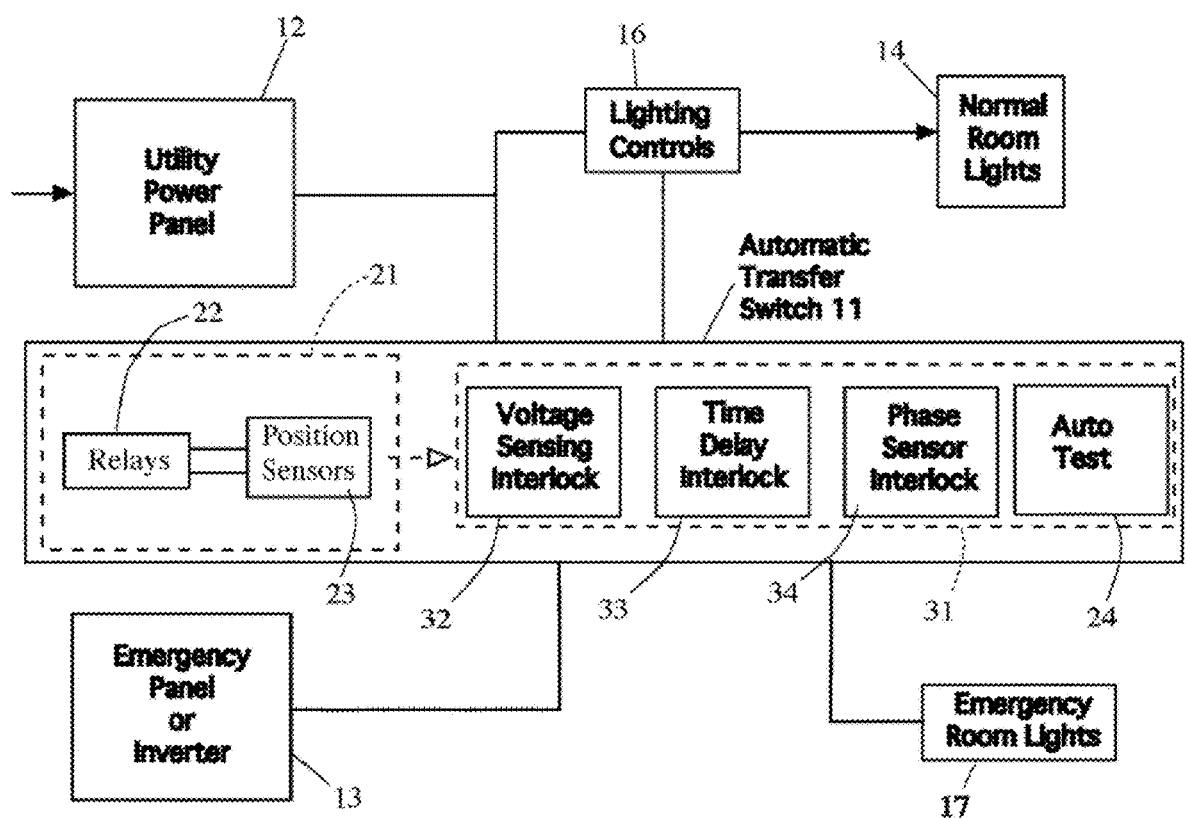
FIG. 1 is a schematic block diagram of an automatic power transfer switch usable with embodiments of the present invention.

As shown in FIG. 1, an automatic power transfer switch (ATS) 11 is connected to a primary power source such as a utility power source or panel 12, and is also connected to an emergency power source or panel 13 (e.g. a battery power inverter). The ATS 11 is further connected to emergency lighting load 17, which is powered by the ATS to illuminate the area in which it is located in the event of failure of the primary power source 12. The ATS also may be connected to additional normal room lighting loads 14 through lighting control 16.

Figure 5:
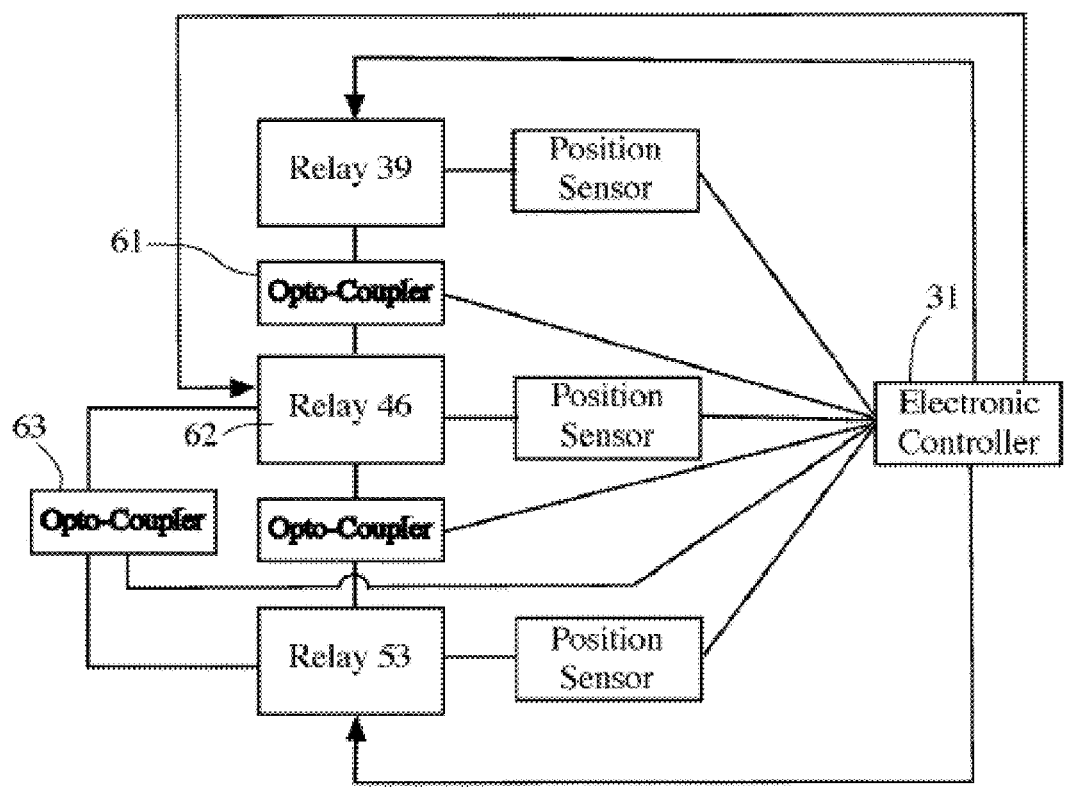
FIG. 5 is a schematic block diagram showing interconnected relays, sensors, and electronic controller in accordance with an automatic power transfer switch according to the invention.

The ATS 11 includes a relay apparatus 21, which is comprised of a plurality of electrical relays 22 (further described below) and an array of position sensors 23 (known in the art and commercially available) to detect the connection state of each of the electrical relays. The ATS 11 further includes a microprocessor-based control system 31 that is connected to the relays 22 to actuate the relays in a predetermined manner according to stored programming, as described below. The control system 31 includes a voltage sensing interlock system 32, a time delay interlock system 33, and a voltage phase sensor interlock system 34. The microprocessor of the control system 31 (not shown) is configured to receive signals from the interlock systems 32-34, as well as signals from position sensors 23 (which detect the positions of the relay contacts as shown in FIG. 5), to control the switching of the relays 22 and substitute the emergency power source 13 for the primary power source 12 as required. An auto test module 24 may be incorporated into the ATS 11 to perform automatic testing of the switch according to a pre-programmed schedule and record the test results (pass or fail) in memory for future recall.

Figure 2:
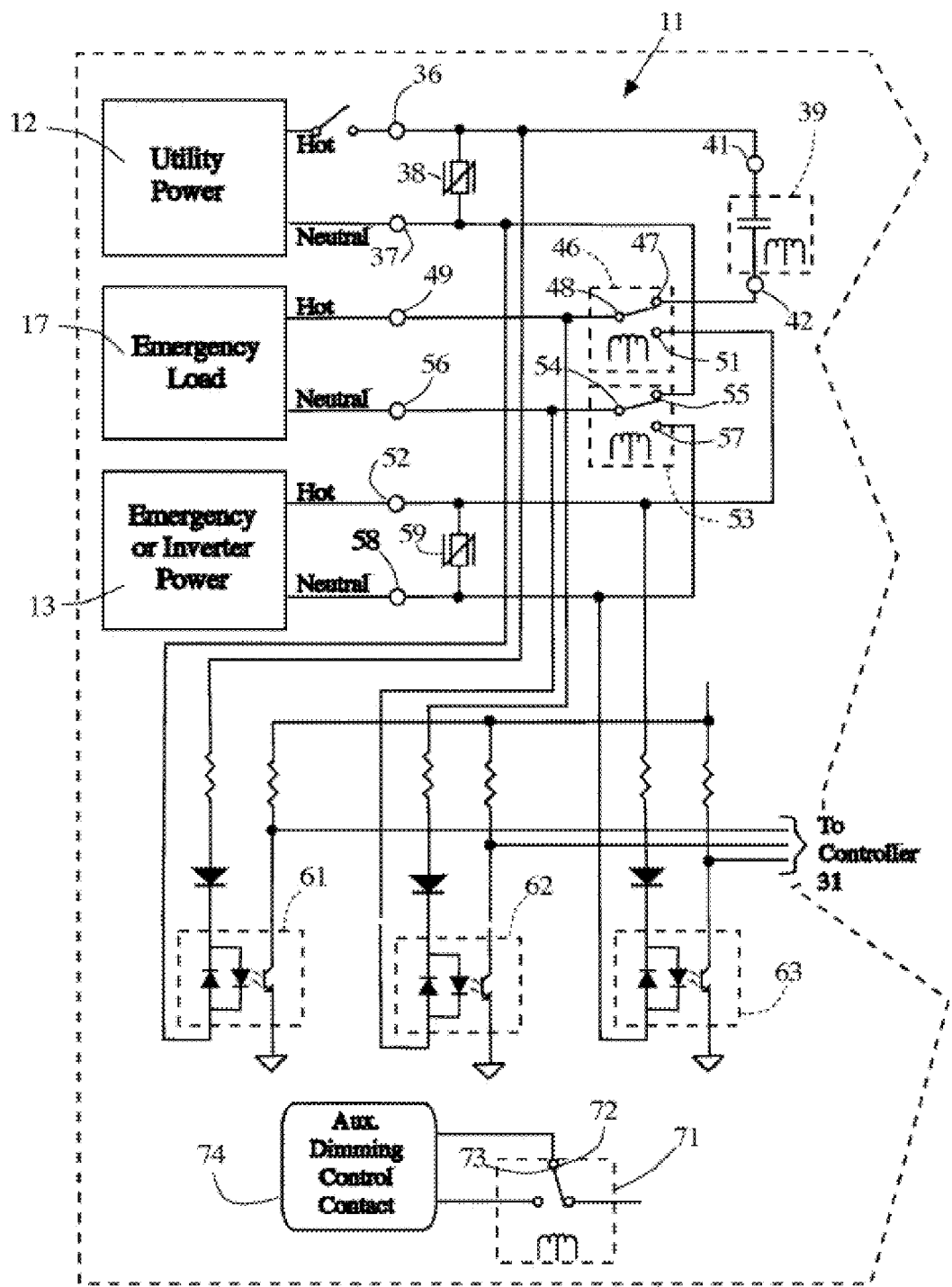
FIG. 2 is a circuit diagram of a portion of the automatic power transfer switch of FIG. 1.

FIG. 2 illustrates a circuit layout of ATS 11 as connected to the primary utility power source 12, the emergency power source or panel 13 (e.g. a battery power inverter), and the emergency lighting load 17. The utility power source 12 includes a hot terminal 36 and a neutral terminal 37, with a varistor 38 connected therebetween to attenuate voltage transients across the power source 12. An isolation relay 39 comprises a single pole single throw (SPST) bistable relay having a first contact 41 connected to the hot terminal 36 of the power source and a second contact 42 connected to hot terminal relay 46. In this manner the hot side of the primary power source 12 is isolated from the other components in the circuit unless the relay 39 is latched in the conductive state. Hot terminal relay 46 comprises a single pole double throw (SPDT) bistable relay having one contact 47 connected to the hot terminal 36 of primary power source 12 through terminal 42 of isolation relay 39. Common switch pole 48 of relay 46 is connected to the hot terminal 49 of the emergency lighting load 17 (which is generally located among the normal room lighting loads 14). The other contact 51 of SPDT relay 46 is connected to the hot terminal 52 of the emergency power source 13. Thus, SPDT relay 46 is operative to connect either the hot terminal 36 of primary power source 12 or the hot terminal 52 of emergency power source 13 to the hot terminal 49 of emergency lighting load 17.

Neutral terminal relay 53 comprises a SPDT bistable relay having a common switch pole 54 connected to the neutral terminal 56 of the emergency lighting load 17, one switch contact 55 connected to the neutral terminal 37 of the primary power source 12, and another switch contact 57 connected to the neutral terminal 58 of the emergency power source 13. A varistor 59 is connected across terminals 52 and 58 of the emergency power source 13 to attenuate voltage transients occurring across the power source 13. Neutral terminal relay 53 operates in conjunction with hot terminal relay 46 such that the hot and neutral terminals of either the primary power source 12 or the emergency power source 13 are connected to the respective hot and neutral terminals of emergency lighting load 17.

Opto-isolator sensors 61, 62, and 63 are provided to detect the voltage levels across the primary power source 12, the emergency lighting load 17, and the emergency power source 13 respectively, in real time. The signals from opto-isolators 61-63 are outputted to controller 31 along with the position sensor signals as shown in FIG. 5, to be used by the voltage sensor interlock 32 and the phase sensor interlock 34. The controller 31 also powers the relays 39, 46, and 53 as shown in FIG. 5, in accordance with the stored programming described below.

FIG. 2 also shows a further feature of the invention wherein an additional auxiliary relay 71 is provided that is actuated by the controller 31. Auxiliary relay 71 may be connected to an auxiliary dimming control circuit 74. Switch pole 72 and relay contact 73 of relay 71 are connected together when relay 71 is actuated by the controller 31 to complete a circuit to auxiliary dimming control circuit 74. Otherwise the switch pole 72 and relay contact 73 are not coupled together, thereby disabling the auxiliary dimming control 74. Relay 71 would be used to interrupt a low voltage dimming signal during a loss of normal power. When the low voltage dimming signal is interrupted, dimming functionality of the load is disabled and the load illuminates at 100%. The auxiliary relay 71 alternatively can selectively provide voltage to three terminal dimming ballasts as needed to ensure dimming functionality is disabled during loss of normal/utility power. Still further, the auxiliary relay 71 can alternatively serve as a dry contact, indicating the state of the automatic transfer switch 11.

Figure 3:
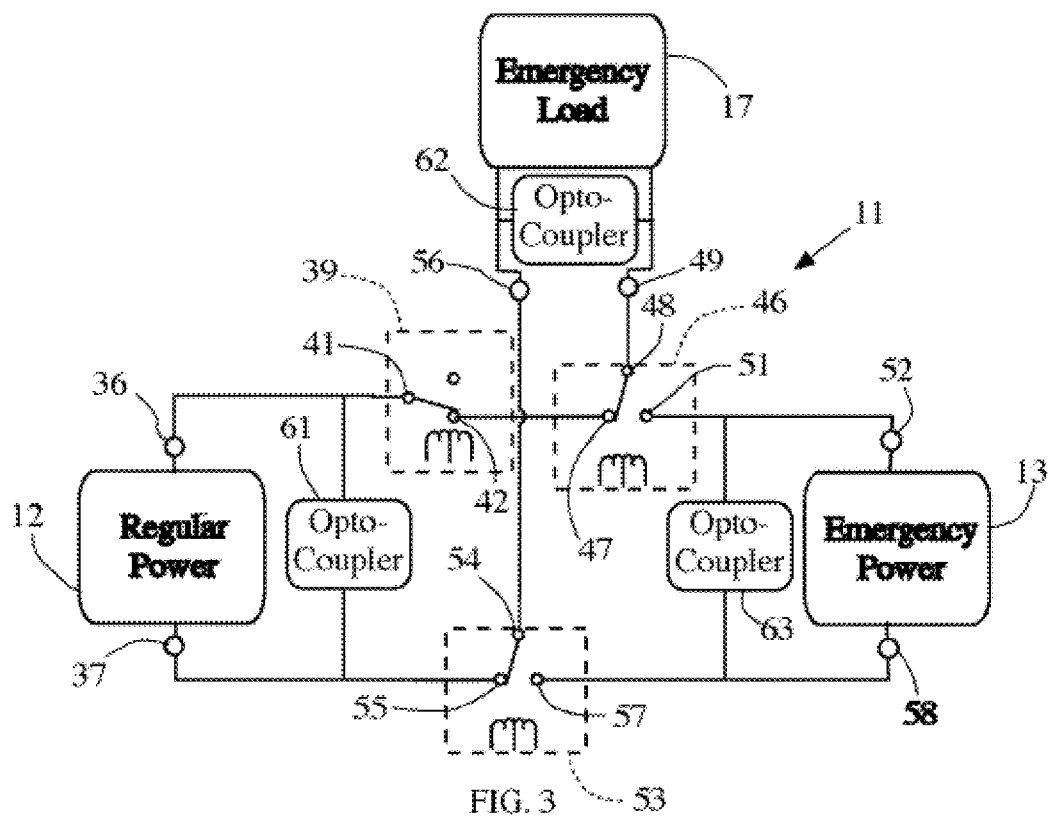
FIG. 3 is a circuit diagram showing the automatic power transfer switch disposed to connect the primary power source to the load.

FIG. 3 shows the ATS 11 disposed in the non-transfer state in which the primary or regular power source 12 is connected to the emergency lighting load 17, and the emergency power source 13 is isolated and inactive. In the non-transfer state the hot terminal 36 of primary power source 12 is connected through SPST relay 39 and SPDT relay 46 to the hot terminal 49 of the emergency lighting load 17. The neutral terminal 37 of primary power source 12 is connected through SPDT relay 53 to the neutral terminal 56 of the emergency load 17. Thus the power circuit from the source 12 to the load 17 is complete. In this state the emergency power source 13 is completely isolated at both the hot and neutral terminals.

Figure 4:
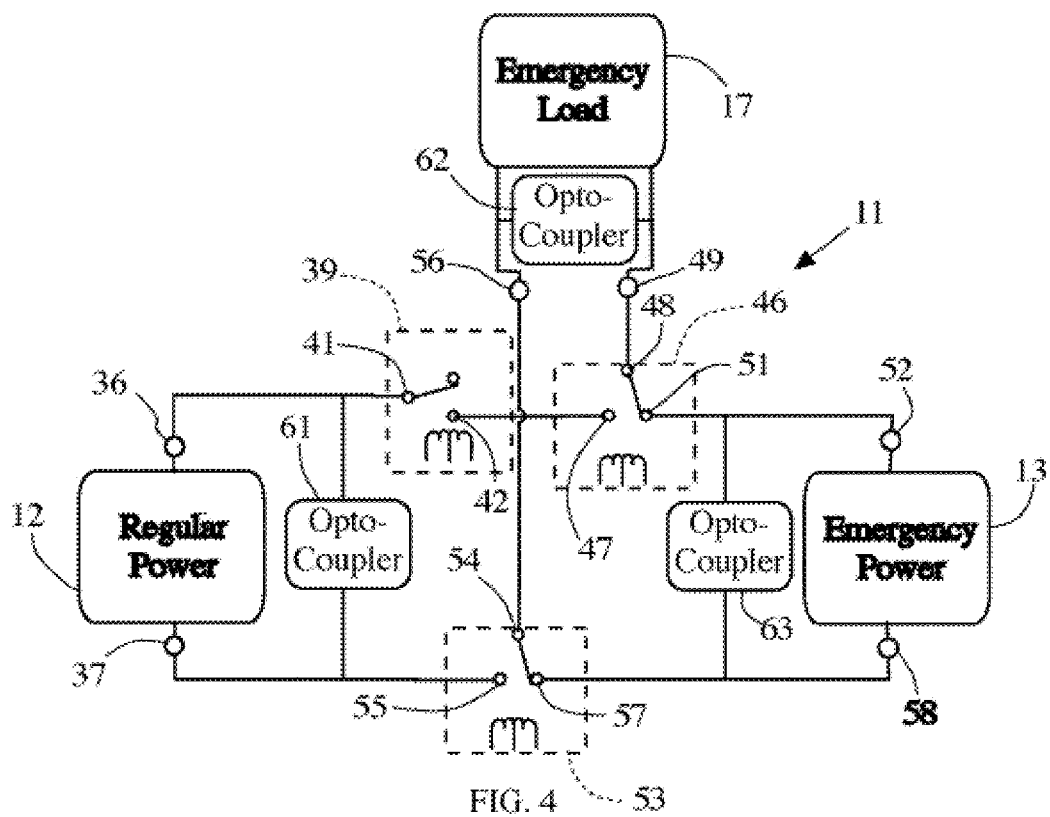
FIG. 4 is a circuit diagram showing the automatic power transfer switch disposed to connect the emergency power source to the load.

When the primary power source 12 fails (as detected by opto-sensor 61), the ATS 11 switches to the transfer state shown in FIG. 4, in which the emergency power source 13 is connected to the load 17, and the primary power source 12 is disconnected. In this state the contacts 41 and 42 of isolation relay 39 are open, disconnecting the hot lead 36 of power source 12 from the circuit and isolating it. Likewise, neutral relay 53 is switched so that switch pole 54 disconnects from contact 55, disconnecting the neutral lead 37 of primary power source 12 from the load 17 and connects to contact 57 thereby connecting neutral lead 58 of emergency power source 13 to the load 17. In addition, relay 46 is switched so that the hot lead 52 of emergency power source 13 is connected through contact 51 and switch pole 48 to the hot lead 49 of load 17. Thus the emergency power circuit to the load 17 is completed. In this state, the primary power source 12 is completely isolated at both the hot and neutral leads.

As noted above ATS 11 thus requires only three relays to carry out the automatic transfer function, whereas most systems known in the art must use four relays for the same purposes. In addition, there are inherent safety features in the relay arrangement of ATS 11:

1) Relay 53 is connected only to neutral terminals of the power sources 12 and 13 and the load 17, eliminating the opportunity for hot power to be switched accidentally to a neutral connection.

2) The hot leads of both power sources 12 and 13 are connected to opposite switch contacts of relay 46, and therefore cannot be connected together in relay 46.

3) In the non-transfer state, the emergency power source 13 is completely isolated from the remainder of the circuit at both the hot and neutral leads.

4) In the transfer state, the regular power source 12 is completely isolated from the remainder of the circuit at both the hot and neutral leads.

The process of switching from the non-transfer state to the transfer state is also provided with inherent safety features.

Figure 6:
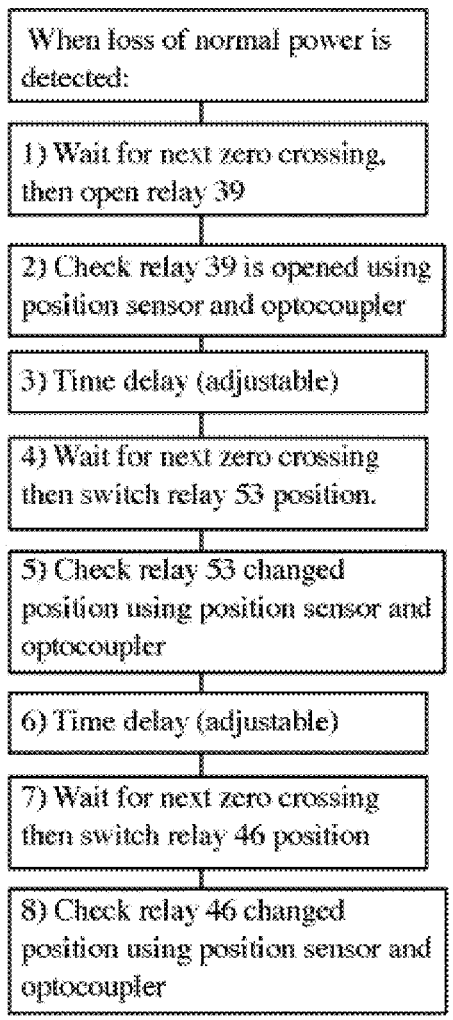
FIG. 6 is a flow chart depicting a transition of the automatic power transfer switch from regular power mode to emergency power mode.

As shown in FIG. 6, when loss of normal (primary) power is detected by a drop in voltage across the utility power leads 36 and 37 as detected by opto-isolator 61, the controller 31 is programmed to wait for the next zero-crossing event, then open relay 39 to disconnect the hot lead 36 of power source 12 from the system. The controller then checks that relay 39 is opened using signals from the relay position sensor and the optocoupler 61. The controller 31 then implements a programmed adjustable time delay and waits for the next zero-crossing event to switch relay 53 to disconnect the neutral lead of power source 12 from the load 17 and thereby isolate the power source 12. At the same time relay 53 connects neutral lead 58 of the power source 13 to the neutral lead of the load 17.

The controller 31 then waits for an additional time delay before detecting the next zero-crossing event to switch relay 46 to connect the hot lead 52 of emergency power source 13 to the hot lead 49 of load 17, and the power circuit from emergency power source 13 to load 17 is thereby completed. As a final check, the controller 31 checks the signals from the relay position sensors and the optocouplers to confirm proper operation. The shift to the transfer state is then complete, and may be maintained indefinitely.

Figure 7:
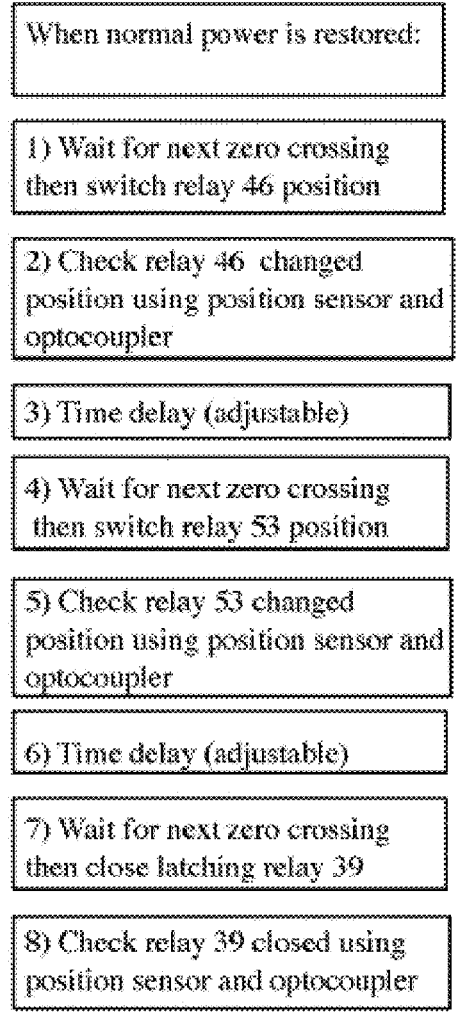
FIG. 7 is a flow chart depicting a transition of the automatic power transfer switch from emergency power mode to regular power mode.

FIG. 7 depicts the processing of switching from the transfer state of FIG. 4 to the non-transfer state of FIG. 3. First, the return to normal operation of the primary power source 12 must be detected by the opto-isolator sensor 61. The controller 31 then waits for the next zero-crossing event and switches relay 46 so that the hot lead 52 of emergency power source 13 is disconnected from the load 17, and switch pole 48 is connected to contact 47. The controller then uses signals from the position sensors and opto-isolators to confirm that relay 46 has switched, and implements a programmable time delay. When the next zero-crossing event occurs, the controller then switches relay 53 so that the neutral lead 58 of power source 13 is disconnected from the load, and connects the neutral lead 37 of primary power source 12 through switch pole 54 and contact 55 to the neutral lead 56 of the load 17.

The controller then checks the sensor signals to confirm that relay 53 has switched, and institutes a programmable time-delay. After the next zero-crossing event the controller closes isolation relay 39, which connects the hot lead 36 of primary power source 12 through switch pole 41 and contact 42 to relay 46 (already connected in the previous step) to complete the power circuit to the load 17. The controller 31 then checks the sensor signals to confirm that relay 39 is properly switched, and the shift to the non-transfer state is thereby completed. The operations depicted in FIGS. 6 and 7 are carried out automatically by the controller 31, without manual intervention and faster than a human operator could perform these functions.

Figure 8:
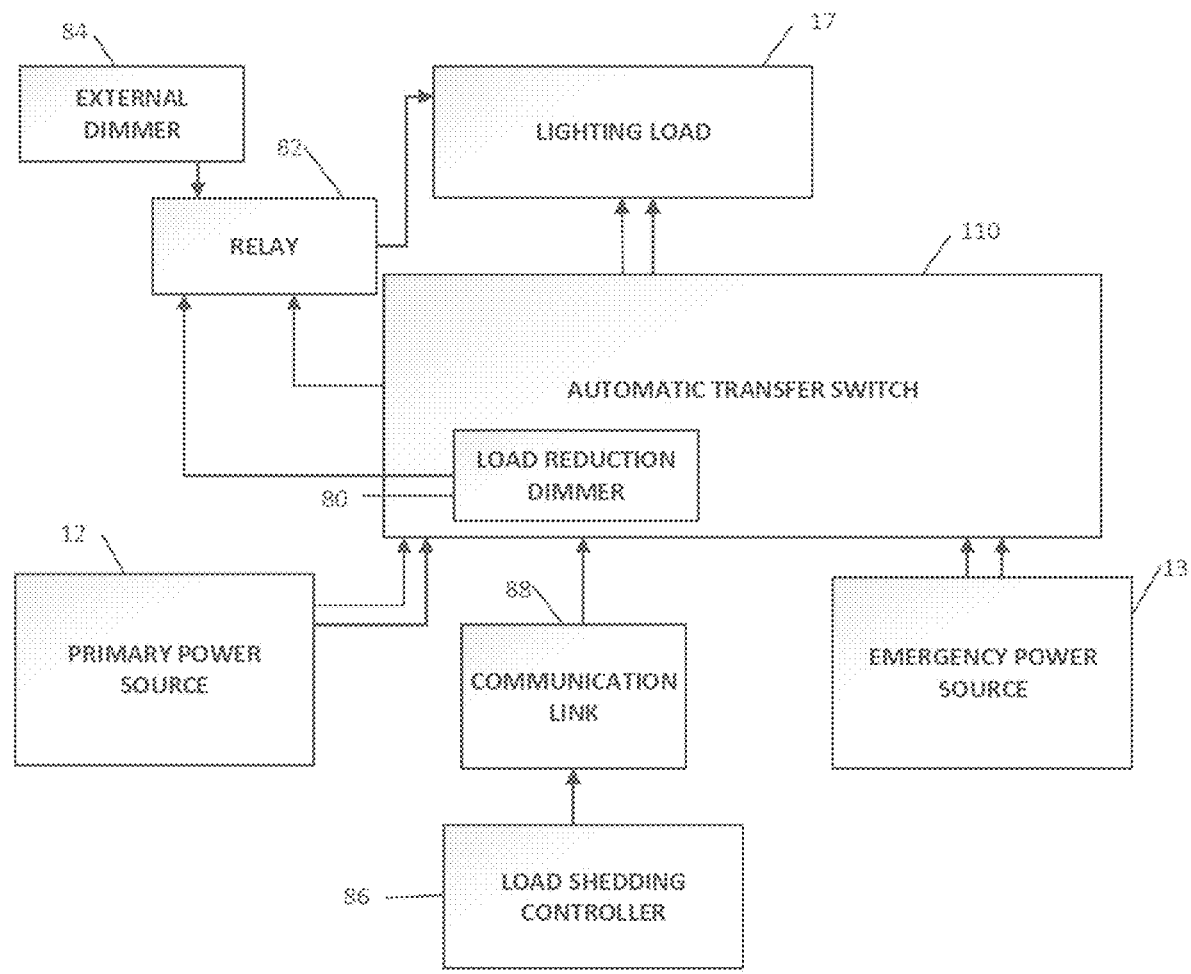
FIG. 8 is a schematic block diagram of an automatic power transfer switch with an integrated load reduction dimmer under control of a load shedding controller according to a further embodiment of the invention.

FIG. 8 illustrates a further embodiment of the invention wherein the system upon transferring to the emergency power mode automatically reduces the demand of the lighting load to reduce the power provided to the load by the emergency power source. This is accomplished by providing a load reduction dimmer capability to the Automatic Transfer Switch. ATS 110 includes a load reduction dimmer 80, but is otherwise the same as ATS 11 described in FIG. 1. As in FIG. 1, ATS 110 is connected to a primary power source 12 and an emergency power source 13, and automatically switches power provided to the lighting load 17 from the primary source to the emergency source in the event of interruption of power or other failure of the primary power source.

In normal operation the ATS 110 connects the primary power source 12 to the load 17, which delivers 100% of the rated light output of the lighting fixtures that comprise the load 17. Alternatively, when an external dimmer 84 is provided, the light output of load 17 can be controlled by the external dimmer 84. In a preferred embodiment, the dimmer 84 provides a dimming signal in the range of 0-10 VDC to the load 17. 0-10V dimming is a well-known form of dimming that does not rely on manipulating the line voltage power going to the lighting load. Instead, the "driver" or "ballast" which is basically the power supply of an LED or fluorescent light, has two additional wires, a purple and a gray wire that connect to an external dimming signal to set the light level. In the embodiment most commonly used, the driver or ballast "sources" the 0-10V current, through a dimmer, and according to the voltage between the purple and gray wires, dims accordingly. Usually 10V is 100%, and 1V is minimum dim setting, which could be 10% or some other preset value. The dimming curve that relates voltage to brightness is not linear and not standard among companies.

The system further includes a remote load shedding controller 86 that is connected to the ATS 110 through a communication link 88. Communication link 88 may be bidirectional or unidirectional, and may be wireless, hard-wired or network/Internet-based. The load shedding controller provides a load reduction signal to load reduction dimmer 80 which is incorporated in the ATS 110. The load reduction dimmer 80 is internal to the ATS 110 and is separate and distinct from any external room dimming devices 84 that may be connected to the load 17 during normal operating conditions. Dimming signals are sent to the load 17 via a relay 82 controlled by the controller in the ATS 110 (which is similar to the controller 31 of FIG. 1), such that the dimmer 84 is disconnected and isolated when the load reduction dimmer 80 is activated by the load shedding controller 86. Further, while the relay 82 is shown in FIG. 8 as being external to the ATS 110, this is for illustration purposes only. Those skilled in the art will recognize that the relay 82 may be located internally to other components, e.g. internal to the ATS 110, with no change in function.

The load reduction dimmer 80 is configured to reduce the output of all lighting fixtures that comprise the load 17 to a reduced level that is less than or equal to the maximum design output of the emergency power source 13. As compared with an emergency power transfer system without automatic load shedding, the demand on the emergency power source 13 is significantly reduced, such that either a smaller size emergency power source may be used, or the emergency power source may provide emergency power to a larger number of lighting and/or other loads to be activated in an emergency situation.

In order to assure that the load shedding controller 86 is functioning properly, monitoring sensors similar to the opto-isolators and position sensors shown in FIGS. 1-5 may be connected to the load shedding controller to provide feedback signals to the controller of the ATS to assure that the amount of dimming that is necessary for the system to remain below the output limits of the emergency power source 13 is provided to the load 17. The load shedding controller 86 may also include a user input to accommodate specific installation parameters of the particular lighting equipment for which the automatic transfer system is being used, as well as to selectively prevent operation of the load shedding controller as may be desired.

The load reduction automatic transfer switch 110 is relatively small and so can be mounted close to the loads that it serves, reducing the amount of dimming cable control wiring otherwise needed to wire a distantly-located transfer system to a load. Prior art load reduction systems built into the auxiliary power source are much larger which puts a constraint on where such systems can be installed. The load reduction automatic transfer switch of the present invention is compatible with generators, inverters, and any other foreseeable auxiliary or emergency power source. By contrast, the prior art requires different devices specifically manufactured to communicate with specific brand DC/AC inverters only. Further, the automatic load reduction transfer switch of the present invention prevents an unreduced load from being applied to the emergency power source, thereby assuring that the maximum power rating of the emergency power source will not be exceeded.

Figure 9:
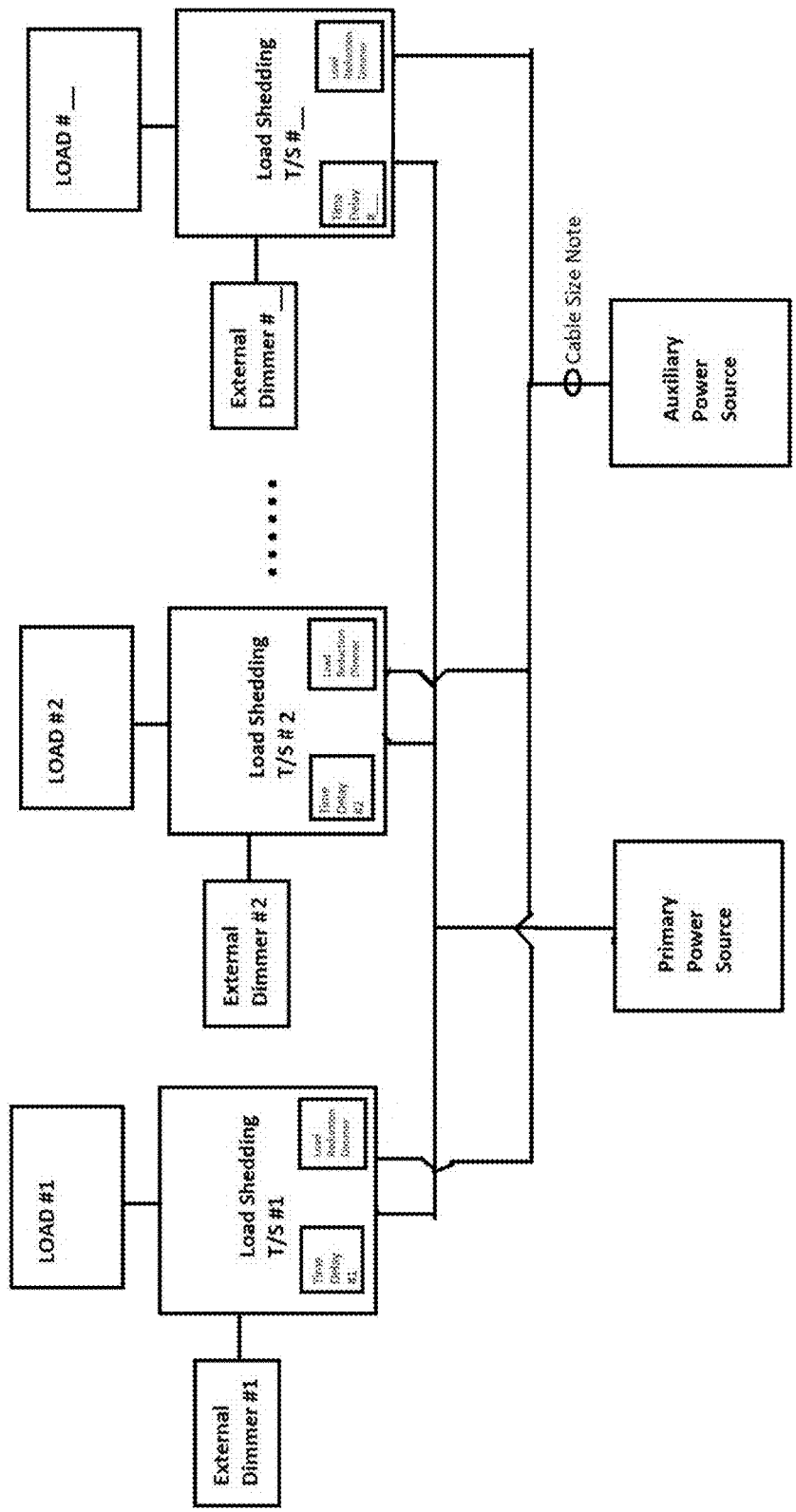
FIG. 9 is a schematic block diagram of an automatic power transfer switch system using multiple automatic power transfer switches to independently control multiple loads according to a still further embodiment of the invention.

FIG. 9 illustrates an alternate embodiment wherein multiple independent automatic load reduction transfer switches are used, such that different areas of a building, stadium, auditorium, etc. may be set to different amounts of load reduction/dimming as desired or appropriate to the particular circumstances. Each of the different load reduction/load shedding transfer switches #1, #2, . . . , #n may be controlled by the same load shedding controller 86 via a communication link, such as from a central control or management location.

The invention having been thus disclosed, it will be apparent to those persons skilled in the art that the same may be varied and modified in many ways without departing from the spirit and scope of the invention. Accordingly the invention is not to be limited by the foregoing detailed exemplary embodiments, but instead any and all such modifications that may become apparent to those skilled in the art are intended to be encompassed by the following claims.

What is claimed is:

1. An automatic power transfer switch system comprising:
a plurality of dimmable lighting loads each adapted to receive a respective dimming control signal and adjust a dimming level of that dimmable lighting load in dependence on the respective dimming control signal;
a plurality of automatic transfer switches each configured to connect a primary electrical power source to at least one of said plurality of dimmable lighting loads under normal operating conditions of said primary electrical power source in a first mode, and to automatically disconnect the primary electrical power source from said at least one lighting load and connect an emergency electrical power source to said at least one lighting load under malfunctioning operating conditions of said primary electrical power source in a second mode, each of said plurality of automatic transfer switches further including a respective integrated load reduction dimmer configured to selectively provide an integrated dimming control signal as the respective dimming control signal to said at least one dimmable lighting load; and
a load shedding controller communicatively coupled to each of said plurality of automatic transfer switches over a plurality of communication links, to provide respective load shedding control signals to respective ones of the plurality of automatic transfer switches, each integrated load reduction dimmer of said respective automatic transfer switches receiving said respective load shedding control signal and developing said integrated dimming control signal in response to said load shedding control signal.

2. The automatic power transfer switch system as set forth in claim 1, further comprising;
an external dimmer controller configured to provide an external dimming control signal as the respective dimming control signal to at least one of said dimmable lighting loads; and
a relay configured to selectively connect either the external dimming control signal from said external dimmer controller or the integrated dimming control signal from the respective integrated load reduction dimmer of the automatic transfer switch associated with said at least one dimmable lighting load, in dependence on the mode of the associated automatic transfer switch.

3. The automatic power transfer switch system as set forth in claim 2, wherein said relay is controlled by said associated automatic transfer switch.

4. The automatic power transfer switch system as set forth in claim 1, wherein at least one of the plurality of communication links is a wired link.

5. The automatic power transfer switch system as set forth in claim 1, wherein at least one of the plurality of communication links is a wireless link.

6. The automatic power transfer switch system as set forth in claim 1, wherein at least one of the plurality of communication links is a network link.

7. The automatic power transfer switch system as set forth in claim 6, wherein said network comprises the Internet.

8. The automatic power transfer switch system as set forth in claim 1, wherein said plurality of dimmable lighting loads are located in different areas of a building.

9. The automatic power transfer switch system as set forth in claim 1, wherein said load shedding controller is configured to provide different load shedding control signals to different automatic transfer switches.

10. The automatic power transfer switch system as set forth in claim 1, wherein at least one of said automatic transfer switches comprises a programmable controller configured to automatically detect normal and malfunctioning operating states of said primary power source and to selectively provide the respective integrated dimming control signal as the respective dimming control signal to at least one of said dimmable lighting loads when said emergency power source is connected to said at least one dimmable lighting load.

11. The automatic power transfer switch system as set forth in claim 1, wherein at least one of said automatic transfer switches transitions between said first mode and said second mode over a period of time in dependence on at least one predetermined time delay.

12. The automatic power transfer switch system as set forth in claim 11, wherein said at least one predetermined time delay is adjustable.

13. The automatic power transfer switch system as set forth in claim 1, wherein at least one of said automatic transfer switches transitions between said first mode and said second mode over a period of time in dependence on a predetermined time delay.

14. The automatic power transfer switch system as set forth in claim 1, wherein at least one of said automatic transfer switches further comprises a plurality of sensors for detecting the operation condition of said primary power source.

15. The automatic power transfer switch system as set forth in claim 1, wherein at least one of the respective dimming control signals is 0-10V DC.

* * * * *